US000001232H

United States Statutory Invention Registration [19]

[11] Reg. Number: H1232

DiSiena

[43] Published: Sep. 7, 1993

[54] MULTI-LEVEL GEOPHONE INSTALLATION FOR VSP

[76] Inventor: James P. DiSiena, 15255 Gray Ridge #622, Houston, Tex. 77082 3031

[21] Appl. No.: 747,138

[22] Filed: Aug. 19, 1991

[51] Int. Cl.[5] ..... G01V 1/18; G01V 1/20

[52] U.S. Cl. ..... 367/57; 166/385

[58] Field of Search ..... 367/25, 57, 81, 911; 340/856, 857; 181/102, 104; 174/117 F; 166/250, 382, 385

[56] References Cited

U.S. PATENT DOCUMENTS

| | | | |
|---|---|---|---|
| 3,866,162 | 2/1975 | Florian | 174/71 R |
| 4,578,785 | 3/1986 | Gelfand | 367/35 |
| 4,791,246 | 12/1988 | Neuroth | 174/117 F |
| 4,901,289 | 2/1990 | Cretin et al. | 367/57 |

*Primary Examiner*—Bernarr E. Gregory

[57] ABSTRACT

What is disclosed is an improvement in a multi-level geophone sonde installation for VSP which includes a well penetrating subterranean formations; surface source for generating and inputting vibrational wave energy; a plurality of geophone sondes with a plurality of detachable geophone sondes disposed in the well with an uppermost sonde and at least a plurality of other lower sondes at predetermined spacings for receiving vibrational wave energy arrival and generating the data indicative thereof; and conductors for getting to the earth's surface a record of the vibrational wave energy arrival data. The cable has a greater width than thickness and is rigid because it is formed in a plurality of vertebrae type formations so that it is self supporting or load bearing. Moreover, the rectangular cable reduces the twist of the cable. The cable has at least two longitudinal load-bearing cables for bearing the entire load of the plurality of geophone sondes and a plurality of longitudinal conductors operationally connectable to the geophone sondes so as to carry to the earth's surface signals indicative of the vibrational wave energy arrival data; and a holder for holding the cable at least adjacent the upper sonde and adapted for holding the entire weight of all the sondes.

6 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MULTI-LEVEL GEOPHONE INSTALLATION FOR VSP

FIELD OF THE INVENTION

This invention relates to vertical seismic profiling. More particularly, this invention relates to an improvement in a multi-level geophone installation for vertical seismic profiling (VSP).

BACKGROUND OF THE INVENTION

The prior art literature is replete with a wide variety of vertical seismic profiling information. An excellent bibliography is contained at the back of the book entitled "Vertical Seismic Profiling"; part A principles; Bob A. Hardage; HANDBOOK OF GEOPHYSICAL EXPLORATION, Section I Seismic Exploration; Claus Helbig and Sven Treitel (Editors); Geophysical Press Limited, Westcombe House, 56–58 Whitcomb Street, (multiple volumes) London WC2H7DR, United Kingdom, 1983. As noted in that book, the Russians have used vertical seismic profiling technology for at least the past twenty-five years and it has become increasingly important in exploration techniques in the free world, particularly, in the United States. That bibliography, or references beginning at page 421, contains records of a wide variety of different approaches, including theoretical treatises and practical installations. As noted in the preface to that book, the inventor of this invention is given credit for significant contributions in the western world, or free world.

The closest prior art of which I am aware is a cable developed by the Kerite Company. Various production committees have suggested that cable would be useful for lowering into the well downhole pumps or the like. This would obviate the requirement for separate load-bearing lineal means, such as tubing, to support the pump and facilitate installation and even removal for repair of downhole pumps or the like.

One of the problems that has been concomitant with vertical seismic profiling in the past has been the unduly long time required to put in multi-level geophone tool into a well. This is particularly important where an offshore rig is standing by while the vertical seismic profiling is being performed at a well location. There has been a longstanding need that the prior art has not yet satisfied for a multi-level geophone sonde installation in which the tool could be emplaced and the vertical seismic profile run within a time period of only five to six hours, instead of having to have at least a full day of rig down time waiting for a vertical seismic profile log to be run.

SUMMARY OF THE INVENTION

Accordingly, it is an object of this invention to obviate the deficiencies of the prior art and provide an improved geophone sonde installation where the geophone sondes can be arranged at a plurality of depths in the well for running a vertical seismic profile log in only a time period of five to six hours so as to obviate the requirement of having downtime of at least a full day or more.

It is a specific object of this invention to provide an improved multi-depth geophone sonde installation in which a single cable provides the load-bearing capability as well as the bringing to the surface signals representative of the wave energy arrival data to the respective geophone sondes at a plurality of depths in the well and without requiring separate running of the load-bearing lineal means with the capability of bearing the load of the plurality of geophone sondes and eliminating the necessity of separate conductor means for the respective geophone sondes run independently of the load-bearing lineal member, especially including means for making electrical interconnections between the respective geophone sondes and the conductors in the load-bearing cable.

These and other objects will become apparent from the descriptive matter hereinafter, particularly when taken into conjunction with the appended drawings.

In accordance with this invention, there is provided an improvement in a multi-level geophone sonde installation which in the prior art has included a well penetrating from the earth's surface into the subterranean formation, a surface source for generating an input vibrational wave energy at the earth's surface, a plurality of geophone sondes with a plurality of geophones disposed in the well adjacent the borehole wall thereof and held against the borehole wall, with an uppermost sonde in a predetermined spacing therebelow, lower sondes being provided for receiving the vibrational wave arrival energy by way of the earth; and means for getting to the earth's surface a record of the vibrational wave energy arrival data. The improvement is characterized by an untwisted cable that has a greater width than thickness so as to have a preferred orientation and having load-bearing cables running longitudinally with conductor cables for connecting to the plurality of geophone sondes and the means for transmitting, or getting to the earth's surface a record of the vibrational wave energy arrival data; and a holder for holding the cable at least adjacent the upper sonde, the holder being adapted to support the weight of the sondes and associated equipment below the uppermost sonde and allow slacking off of the cable from the uppermost sonde to the surface of the earth so as to minimize downgoing signals from the surface source.

DESCRIPTION OF PREFERRED EMBODIMENTS

Figure 1:
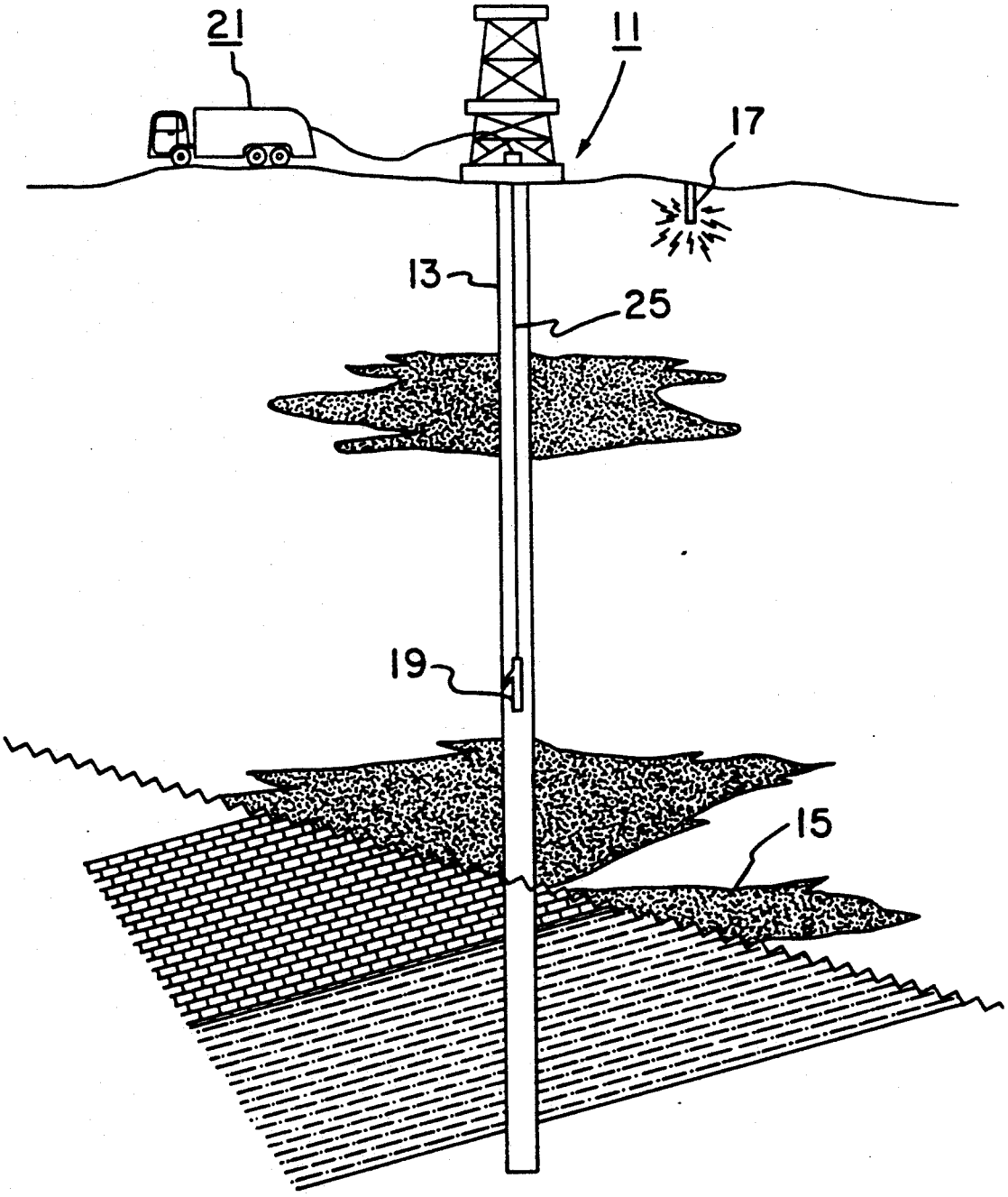
FIG. 1 is a schematic illustration of a prior art installation, such as disclosed in the hereinbefore referenced text "Vertical Seismic Profiling".

Referring to FIG. 1, an exploring unit 11 is suspended in a well 13 penetrating the earth's subterranean formations 15. The exploring unit 11 also includes a surface source 17 for generating an input vibrational wave energy at the earth's surface. The exploring unit 11 also includes a plurality of geophone sondes 19. Disposed in the well adjacent the borehole wall thereof and held against the borehole thereof with an uppermost sonde at a predetermined spacing therebelow, lower sondes for receiving vibrational wave arrival data; and means for getting to the earth's surface a record of the vibrational energy arrival data, including a surface recording truck 21. The invention is characterized by an improvement comprising untwisted cable means 25, FIG. 3, having a greater width than thickness, similarly as illustrated in FIG. 4, so as to have a preferred orientation. The cable has at least two load-bearing cables 27, 29 adjacent each edge and adapted for bearing the entire load of the plurality of geophones and the plurality of conductors 31 between the load-bearing cables lateral of the cable means. The plurality of conductors are connected so as to carry to the surface signals indicative of the vibrational energy arrival data. The cable has a plurality of electrical outlet connections for connecting to the respective geophone sondes.

The exploring unit 11 also has a holder means for holding the cable at least adjacent the upper sonde so that the cable can be slacked off. The holding means is adapted for holding the entire weight of all geophones sondes and allowing slacking off of the tension of the cable between the upper sonde and the earth's surface so as to minimize downgoing signals from the surface source.

The typical exploring unit of FIG. 1 is well recognized in the art and does not need a great deal of application herein. Sufficient to note that the well 13 is drilled into subterranean formation 15 by conventional techniques. A surface source 17 may comprise explosive or simply another unit to input vibrational energy. Typical of these input units are the air sources, or the weight dropping sources.

The geophone sondes are substantially the same as the geophones that are normally employed for seismic exploration and detect vibrational energy, except sondes can be, with this invention, smaller and much lighter weight than the prior art, since the cable can be pushed through any heavy drilling mud. The smaller, lighter sondes are preferred, since they will have a high resonance capability by being smaller. The cable is load bearing. Geophones can use the cable as part of their stabilities in clamping. In prior multi-level sondes, the geophone was load bearing and had to be much larger and heavier. It is noteworthy that the energy wave arrival data may be sent to the surface as it occurs or stored and then sent to the surface in a time sharing mode, depending upon the number of conductor channels available in the cable and the number of geophone sondes that are employed downhole. Frequently, the pulse power applied from the source repeatedly energizes the respective receivers to produce sharp, time-spaced acoustic pulses or similar pulses indicative of the arrival of the wave energy from the source 17.

Figure 2:
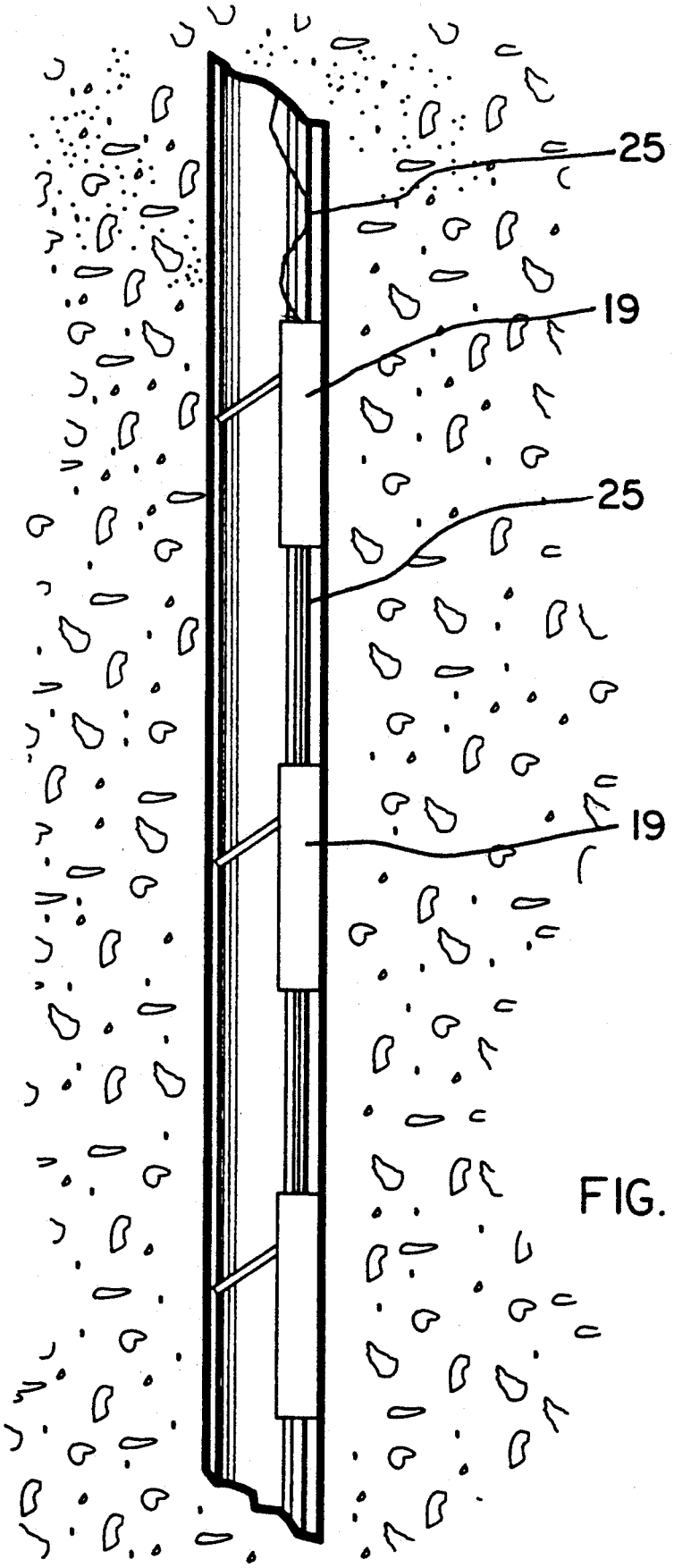
FIG. 2 is a partial schematic illustration of a well bore with a multi-level VSP geophone system installed in the well bore penetrating subterranean formations.

Referring to FIG. 2, an uppermost geophone sonde 19 may be employed with a plurality of downwardly spaced other geophone sondes 19 and connected by cable 25. The cable 25 intermediate the geophone sondes 19 does not have to be slacked off but it is advisable to slack off the cable 25 above the top geophone sonde in order to minimize interference with downgoing waves from the wave energy.

Figure 3:
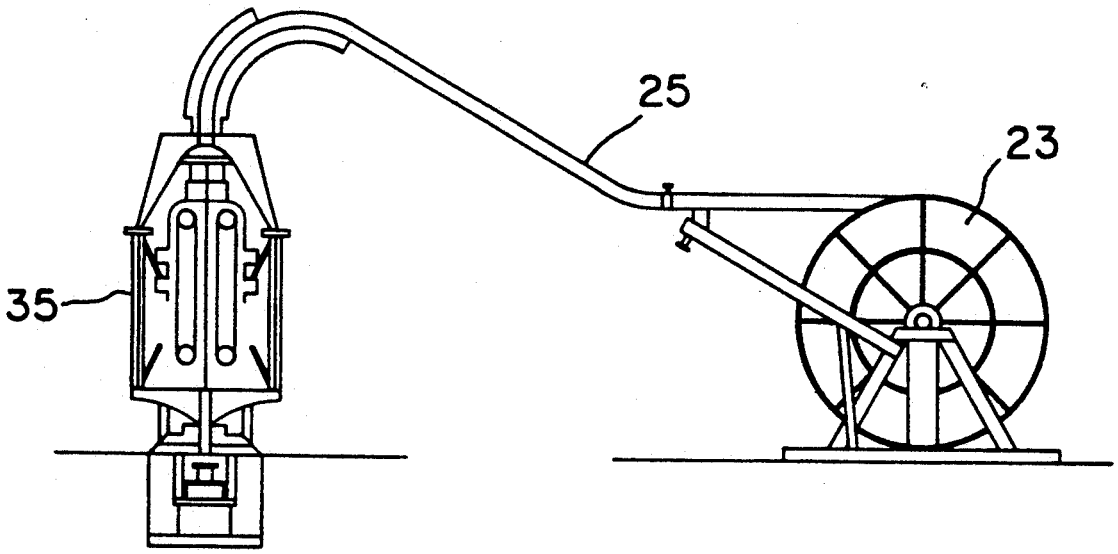
FIG. 3 is a somewhat schematic illustration of a cable spool employed as the means for unspooling into a well bore penetrating the subterranean formation a cable in accordance with the one embodiment of this invention.
Figure 4:
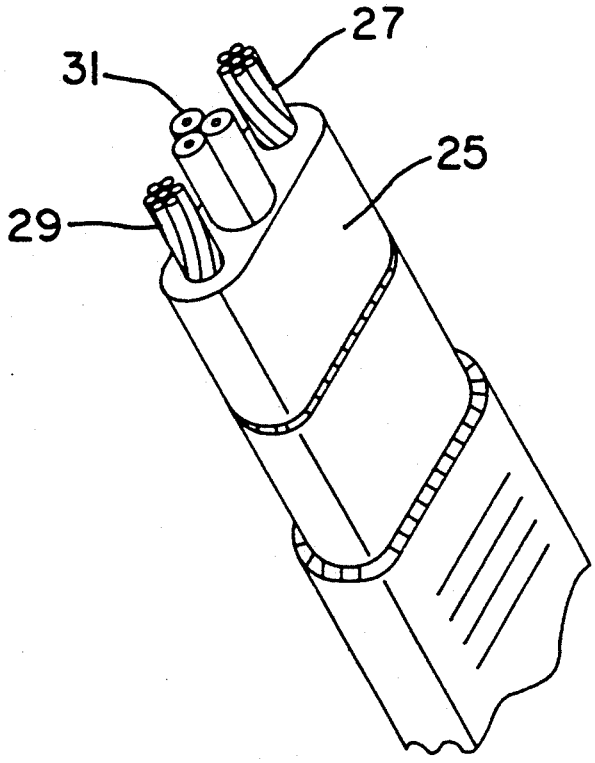
FIG. 4 is a schematic illustration one embodiment with a plurality of conductors in the center between two load-bearing cables in the cable means.

Referring to FIG. 3, the cable 25 may be spooled from a holder, or spool 33 and input through a unit 35 with a preferred orientation. Specifically, referring to FIG. 4, the preferred orientation will be, ordinarily, with the flat surface input through the unit 35.

Figure 5:
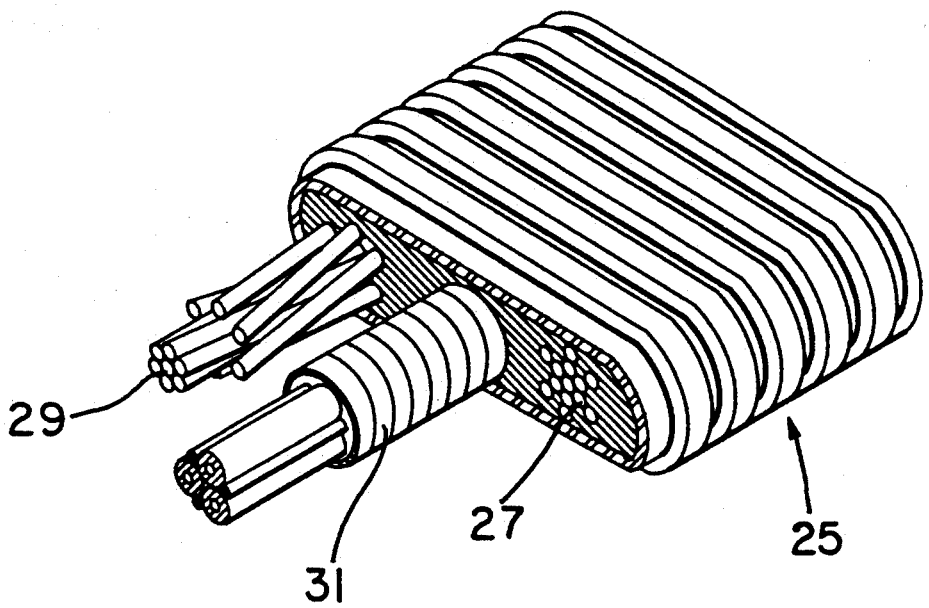
FIG. 5 is another view showing greater detail of the cable in accordance with an embodiment of this invention.
Figure 6:
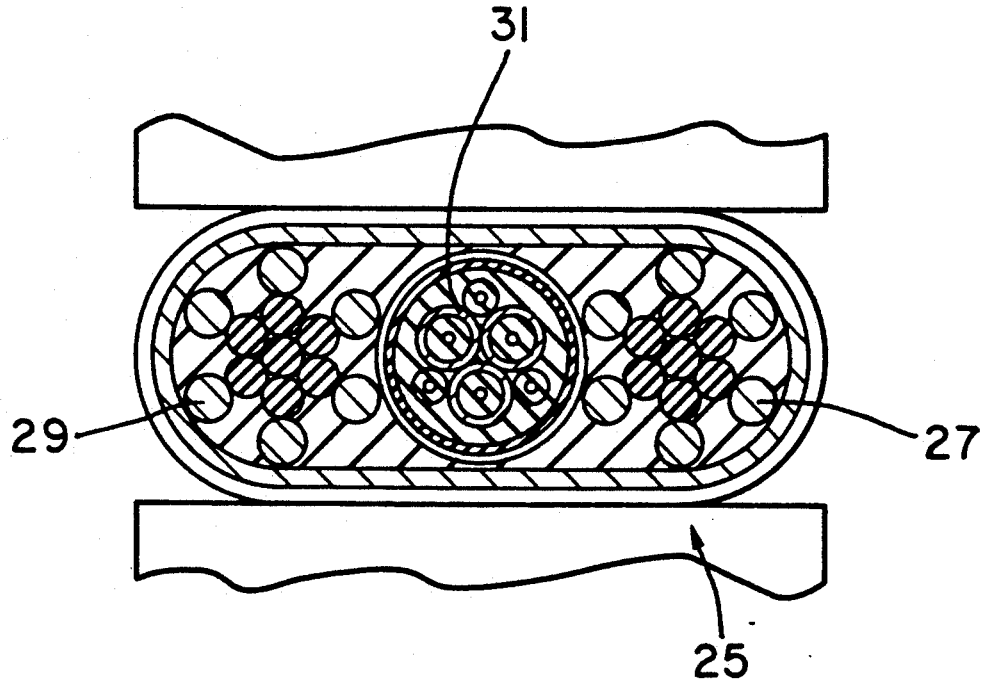
FIG. 6 is a cross-sectional view of the cable of FIG. 5.

The cable 25 is illustrated more nearly completely in FIGS. 5 and 6. Therein the cable 25 includes the respective longitudinally extending load-bearing cables 27, 29 adjacent each edge with the respective conductors 31 intermediate the load-bearing cables. Other arrangements can be employed as desired.

Figure 7A:
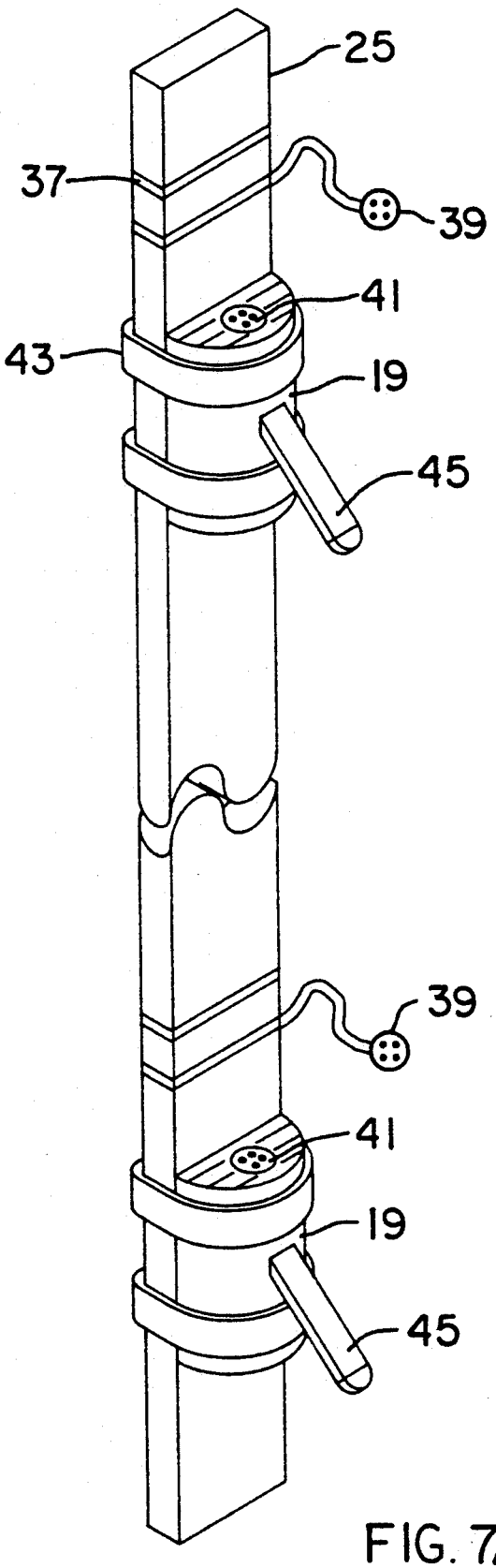
FIG. 7*a* is a partial isometric view of a plurality of geophone sondes and a load-bearing cable and signal carrier in accordance with an embodiment of this invention.

In the embodiment illustrated in FIG. 7*a*, the cable 25 has respective vertebrae 37 and out of each vertebrae is a pressure compensated connector 39 that can be connected into a mating connector 41 on top of each geophone sonde 19. The illustrated embodiment could be expanded considerably. For example, an embodiment could be provided to include the cables inside load bearing coil tubing. If desired, electrical take out can be improved and particularly the take out could be added only at vertebrae between adjacent cable sections to maintain cable strength. The drawing of FIG. 7*a* is not to scale and the vertebrae may be located with the respective electrical connectors, at distances as desired; for example, five to ten meters. This allows the geophone sondes to be emplaced every five to ten meters in the well.

Figure 7B:
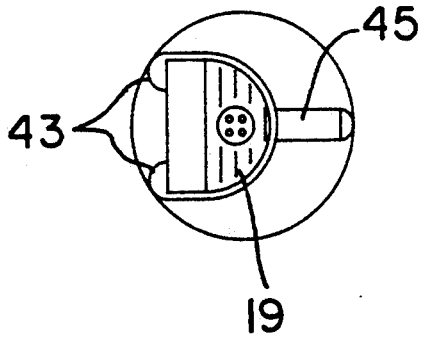
FIG. 7*b* is a schematic cross-sectional view showing the geophone sonde disposed in a well with standoff nodes and arms.

As illustrated, there are standoff nodules 43, seen in both FIGS. 7*a* and FIG. 7*b* that help the respective geophone sondes to be maintained at the desired position by clamp-off arm 45. The stand off nodules 43 can be used to help attach geophone sondes to the cable during makeup. Specifically, as shown in FIG. 7*a*, the nodule, or sonde, can be detached when the cable 25 is spooled onto a wire-line drum and attached as needed. Specifically, the pressure compensated connector 39 can be connected onto the mating connector 41 at the top of each Geophone sonde 19 as illustrated.

Figure 8A:
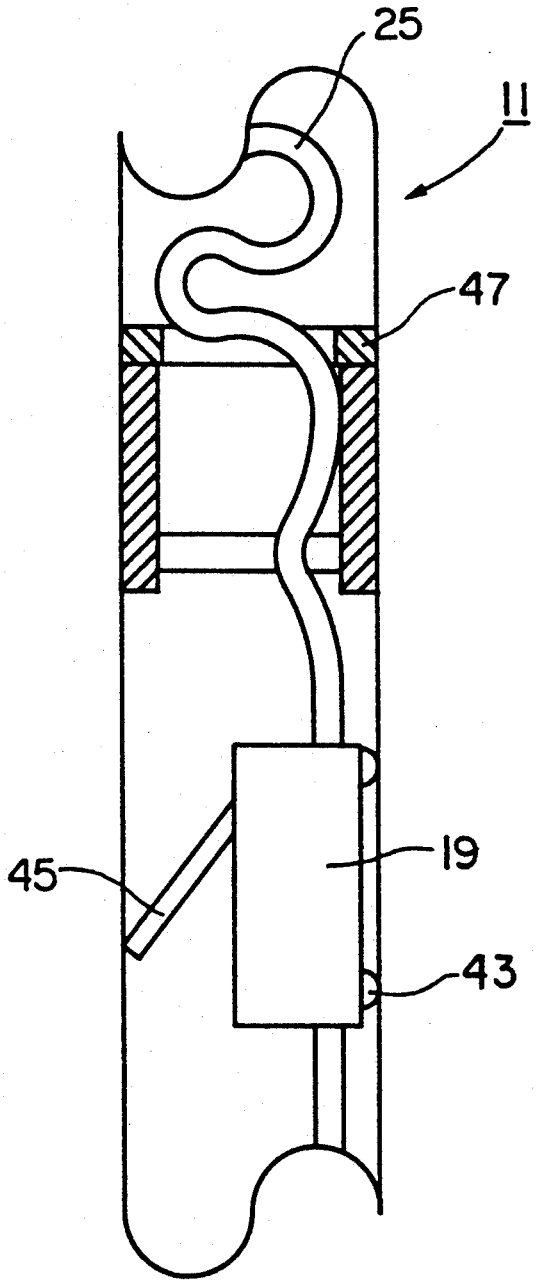
FIG. 8*a* is a schematic illustration of one embodiment of this invention in which a holder is employed adjacent the top geophone sonde for allowing slacking off of the cable thereabove to minimize downgoing signals.

Referring to FIG. 8*a*, the exploring unit 11 with its cable 25 includes a holder 47 at the top adjacent the geophone sonde 19 so as to bear the weight of all lower geophones, as well as the top geophone sonde 19, and associated downwell equipment. This allows slacking off of the cable 25 above the top geophone sonde 19 and alleviate problems with downgoing wave energy traveling by way of a cable under tension.

Figure 8B:
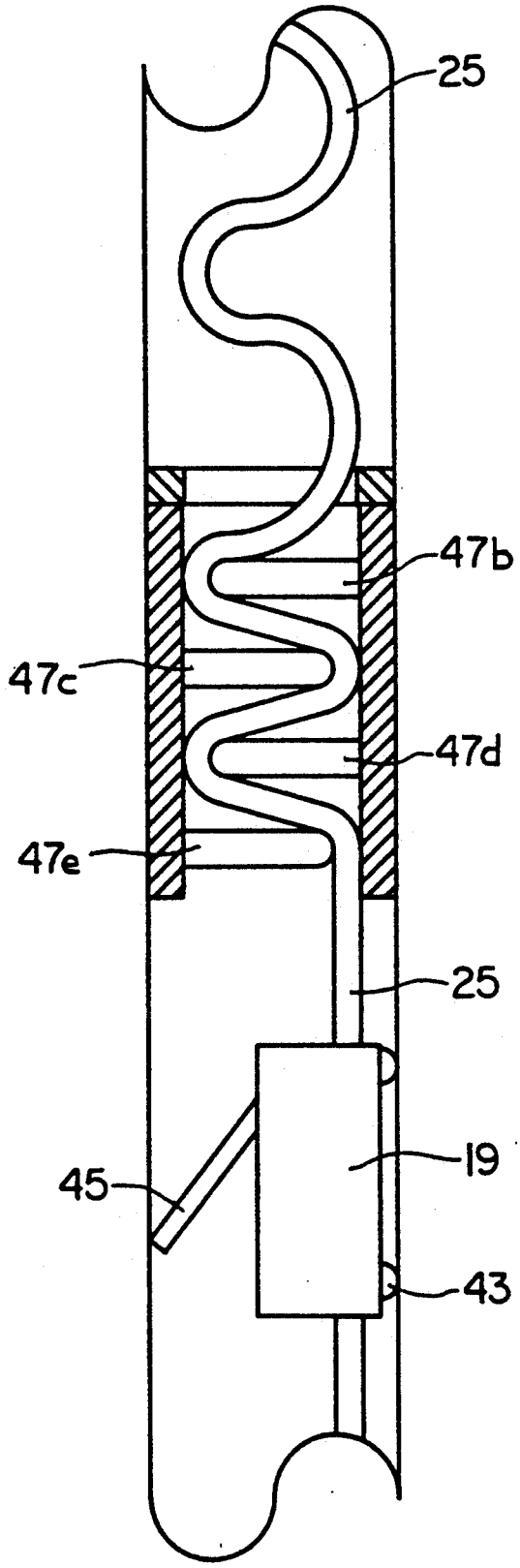
FIG. 8*b* is a schematic illustration of another holder means in accordance with another embodiment of this invention for allowing slacking off of the cable thereabove.

The holder 47 can take any of the form desired. For example, shown in FIG. 8*b*, it may simply be asymmetric rollers such as 47*b*, 47*c*, 47*d*, and 47*e*. These asymmetric rollers can be activated as desired to hold the cable 25 and allow slacking off above the rollers, yet hold the cable 25 to bear the weight of geophones therebelow.

Expressed otherwise, the holder 47 may comprise a clamping means for clamping the cable with a predetermined orientation, where it is simply clamped into the wall of the wellbore, as with a clamp arm or the like, or it may comprise any other suitable means such as asymmetric rollers that hold the cable with a predetermined orientation such as with the flat side gripped by the rollers. The cable does not necessarily maintain orientation. It will orient itself as it naturally would be inclined to do. Over 1000 feet or so, where the measurement will be taken, it may be rigid whereas the prior art would be rigid only for a smaller interval. The orientation may be determinable but it should ordinarily, particularly when used in a horizontal borehole, seek the orientation for the top of the geophone sonde with its arm 45 should seek the top of the borehole if a top exists.

It may be necessary to determine orientations by other sensors of which a gyro is an example.

From the foregoing it can be seen that this invention accomplishes the objects set out hereinbefore. Specifically, this invention provides an improved geophone sonde installation wherein the geophones are arranged at a plurality of depths in a well for running a vertical seismic profile log in only a time period of five to six hours so as to obviate the requirement of having a rig downtime of at least a full day or more.

It is worth noting that the geophone sondes have the ability to be used in high deviation holes such as horizontal or holes that are drilled to approach horizontal orientation. Moreover, because of the structural strength, the cable enables pushing the light-weight, small sondes downwardly through even bridges that might be lightly formed in a well. It is particularly worth noting that the light weight, small sondes can be pushed through heavy drilling mud in highly deviated holes or the like.

Having thus described the invention, it will be understood that such description has been given by way of illustration and example and not by way of limitation, reference for the latter purpose being had to the appended claims.

What is claimed is:

1. In a multi-level geophone sonde installation which includes:

a. a well penetrating from the earth's surface deeply into subterranean formations;

b. a surface source for generating and inputting vibrational wave energy at the earth's surface;

c. a plurality of geophone sondes with a plurality of geophone disposed in said well adjacent the bore hole wall thereof and held against the borehole wall thereof with an uppermost sonde and a predetermined spacings therebelow, lower sondes for receiving vibrational wave energy arrival data;

d. means for getting to the earth's surface a record of said vibrational wave energy arrival data;

the improvement comprising:

e. an untwisted cable means having a greater width than thickness so as to have a preferred orientation; said cable having a least two load-bearing cables adjacent each edge and adapted for bearing the entire load of said plurality of geophones and a plurality of conductors between said load-bearing cables laterally of said cable means; said plurality of conductors being connected so as to carry to the surface signals indicative of said vibrational energy arrival data; said cable having a plurality of electrical outlet connections for connecting thereto respective said geophone sondes; and f. holder means for holding said cable at least adjacent said upper sonde; said holding means being adapted for holding the entire weight of all sondes and allowing slacking off of tension on said cable between said upper sonde and said earth's surface so as to minimize downgoing signals from the surface source.

2. The improved system of claim 1 wherein said holder means includes a clamping means for clamping said cable means to a geophone sonde with a determined orientation.

3. The improved system of claim 1 wherein said cable means is in the form of a plurality of vertebrae with a continuous set of load-bearing cables at each side with a plurality of electrical outlet connections at respective plurality of predetermined spacings along said cable beginning at a predetermined depth distance along said cable when said cable is lowered into said well.

4. The improved system of claim 3 wherein said plurality of vertebrae comprising said cable means impart the ability to deploy a geophone system in heavy drilling mud, deviated wellbores and even horizontal wells.

5. A system for use in seismic surveying in a borehole, comprising:

a. a cable assembly having at least two load bearing cables separated from each other and electrical conductors interposed between said load bearing cables;

b. said cable assembly having plural electrical takeoff connectors coupled thereto, said connectors being spaced along a length of said cable assembly in predetermined intervals;

c. plural geophones removably coupled to said cable assembly and coupled to selected ones of said connectors.

6. The system of claim 5 further comprising means for slacking off of that portion of said cable assembly that is above an uppermost geophone on said cable assembly, said slacking means being coupled to said cable assembly.

* * * * *